No. 710,871. Patented Oct. 7, 1902.
A. A. KOCH.
BORING AND TENONING MACHINE.
(Application filed Jan. 23, 1902.)
(No Model.)

WITNESSES:

INVENTOR
Arthur A. Koch
BY
ATTORNEYS

UNITED STATES PATENT OFFICE.

ARTHUR A. KOCH, OF MONTEZUMA, IOWA.

BORING AND TENONING MACHINE.

SPECIFICATION forming part of Letters Patent No. 710,871, dated October 7, 1902.

Application filed January 23, 1902. Serial No. 90,875. (No model.)

*To all whom it may concern:*

Be it known that I, ARTHUR A. KOCH, a citizen of the United States, residing in Montezuma, in the county of Poweshiek and State of Iowa, have invented a new and Improved Boring and Tenoning Machine, of which the following is a full, clear, and exact description.

The invention relates to woodworking machinery; and its object is to provide a new and improved boring and tenoning machine which is simple and durable in construction, very effective in operation, easily manipulated, and arranged to permit of accurately forming tenons on the ends of wheel-spokes and boring felloes and other articles.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all of the views.

Figure 1:
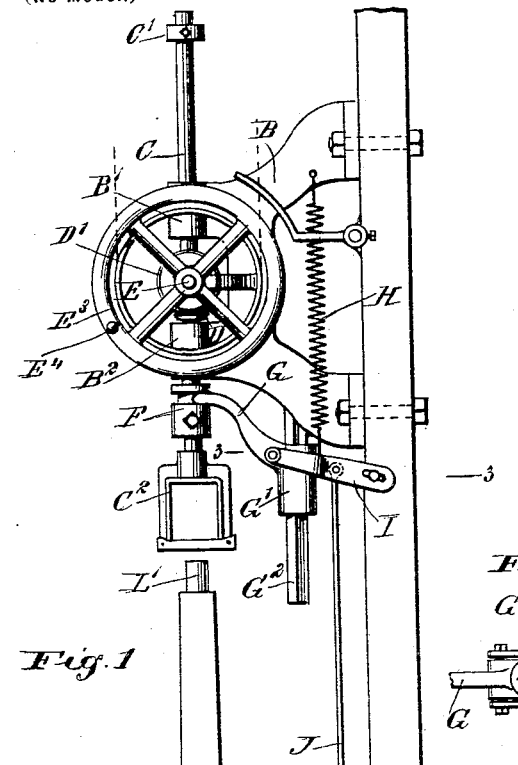
Figure 2:
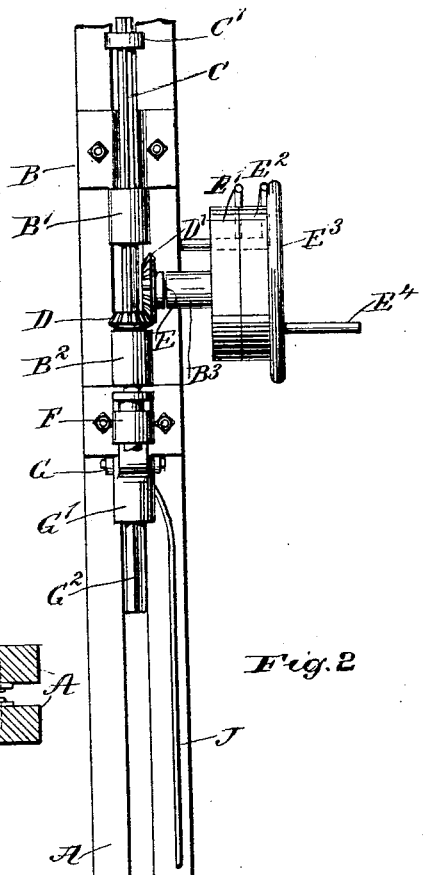
Figure 3:
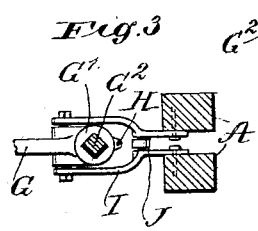
Figure 4:
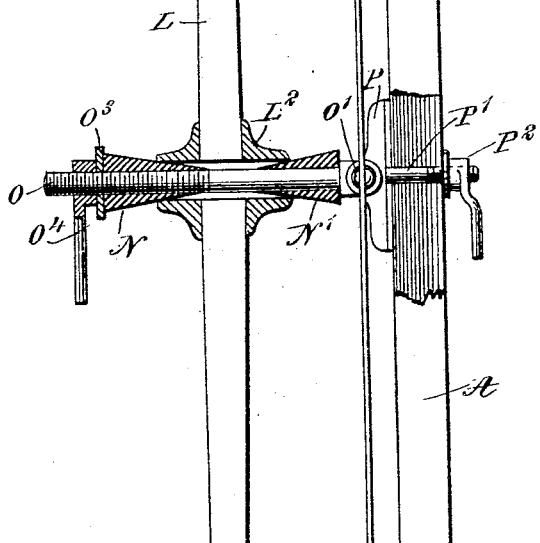
Figure 4:
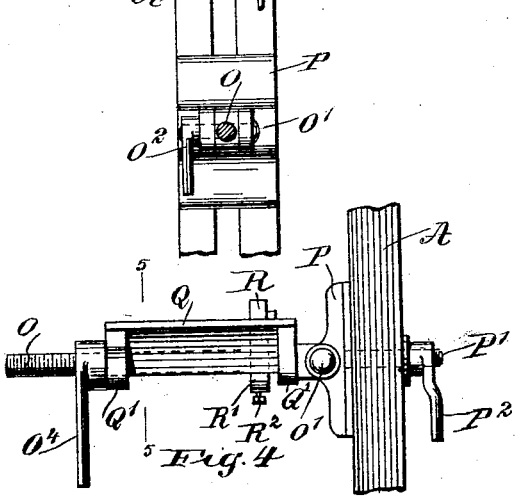
Figure 5:
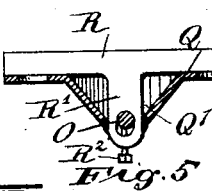

Figure 1 is a side elevation of the improvement arranged for cutting tenons on the ends of wheel-spokes, part being shown in section. Fig. 2 is a face view of the same, part of the work-support being shown in section. Fig. 3 is a sectional plan view of part of the improvement, the section being on the line 3 3 of Fig. 1. Fig. 4 is a side elevation of the support for felloes and other articles; and Fig. 5 is a sectional front view of the same, the section being on the line 5 5 of Fig. 4.

The improved boring and tenoning machine is mounted on the spaced uprights A, on which is secured a bracket B, formed with bearings B' and $B^2$ for the spindle or shaft C to rotate in, the said shaft being provided at its upper end with an adjustable stop-collar C', adapted to abut or rest on the upper end of the bearing B' at the time the shaft is moved into a lowermost position, and on the lower end of the said shaft C is secured the cutting-tool $C^2$, which may be in the shape of a bit for boring holes or in the form of a tenoning-tool, as indicated in Fig. 1, for forming the tenons on the ends of wheel-spokes.

The shaft C is formed with a longitudinally-extending groove, engaged by a key in a bevel-pinion D, resting on top of the bearing $B^2$, and the said pinion is in mesh with a bevel gear-wheel D', secured on a shaft E, mounted to turn in a bearing $B^3$, extending transversely and forming part of the bracket B. On the shaft E are arranged the loose and fast pulleys E' and $E^2$, connected by a belt with other machinery for imparting a rotary motion to the said shaft E, and on the fast pulley $E^2$ is formed a fly-wheel $E^3$, having a handle $E^4$, adapted to be taken hold of by the operator to enable the latter to turn the shaft E by hand whenever it is desired to do so. Now when the shaft E is rotated the bevel gear-wheel D' and pinion D impart a rotary motion to the vertically-disposed main shaft or spindle C. In order to impart a vertical sliding or feeding motion to the shaft or spindle C, I provide the same near its lower end with a shifting collar F, engaged by a shifting arm G, having its hub G' mounted to slide vertically on a guideway $G^2$, secured to or forming part of the bracket B. A spring H, held on the bracket B, is connected with the hub G' of the arm G, so as to hold the latter normally in an uppermost position and with it the shaft C and the cutting-tool $C^2$, as indicated in Fig. 1. The arm G is pivotally connected with a lever I, loosely fulcrumed on the uprights A and pivotally connected by a link J with a treadle K, fulcrumed on the lower portion of the uprights A to be within convenient reach of the operator's foot. Now when the operator presses the treadle K a downward swinging motion is given to the lever I to move the arm G downward, so that the shaft or spindle C is moved in the same direction to bring the cutting-tool $C^2$ in engagement with the work. By the arrangement described it requires but a short movement of the treadle in order to move the feed-shaft C a considerable distance, and when pressure on the treadle K is released then the several parts are immediately returned to an uppermost normal position by the action of the spring H.

As indicated in Fig. 1, the cutting-tool $C^2$ is forming the tenons L' on the spokes L of a wheel having its hub $L^2$ mounted to rotate on the cones N and N', removably held on a rod O, fulcrumed on a pivot O', carried in lugs on a block P, vertically adjustable on the uprights A by means of a bolt P' and handled nut P², as plainly indicated in Fig. 1. A handled nut O² screws on the pivot O' to securely clamp the rod O in position after the same has been moved into the desired position for properly supporting the work. The innermost cone N' rests with its base end against a shoulder on the rod O, and the base end of the other cone N is engaged by a washer O³, a handled nut O⁴ screwing on the outer threaded end of the rod O, so as to properly support the wheel in position and to hold it against accidentally turning during the time the tenon L' is formed on the end of the spoke L by the cutting-tool C². When the tenon has been formed, then the operator simply slackens the nut O⁴ and then turns the wheel to bring the next spoke in proper alinement with the cutting-tool C², after which the operator can screw up the nut O⁴ to securely clamp the wheel in place for the time being. When it is desired to bore fellies or other articles, then the cones N and N' are removed from the rod O and a support in the form of a table Q, having apertured lugs Q', is engaged with the rod O, as plainly shown in Fig. 4, the rod then extending through the lugs Q'. The table Q is provided in its top with an opening for the passage of a depending apertured lug R' of a gage R, adapted to rest on the upper surface of the table, the said lug R' engaging the rod O between the lugs Q' and the said lug R' being fastened in place after the gage is adjusted by a set-screw R², as will be readily understood by reference to Figs. 4 and 5. The gage serves to properly hold the fellies in position to insure accurate boring of the holes in the fellies. The table Q is clamped in position on the rod O by the handled nut O⁴, it being understood that when this table is used the boring spindle or shaft C carries a cutting-tool in the form of a bit. By having the rod O pivoted on the block P it may be swung at any desired angle to allow boring the tenons L' on dished wheels and also allows boring of angular apertures in the work supported on the table Q.

It is understood that when the work is in proper position and the shaft E and spindle C are rotated and the operator presses the treadle K then the cutting-tool C² is gradually moved in engagement with the work to form the tenon thereon or to bore a hole in the work, and when the collar C' moves in contact with the bearing B' then further downward feeding of the shaft C is prevented, and consequently the cutting-tool C² cuts only to the desired depth. As soon as the operator releases the pressure on the treadle K the spring H returns the parts to a normal uppermost position—that is, moves the cutting-tool C² out of engagement with the work.

Having thus described my invention, I claim as new and desire to secure by Letters Patent—

1. A boring and tenoning machine comprising a supporting-frame, a bracket secured to said frame, a spindle for carrying the boring or tenoning tool, and extending through bearings on the bracket, a gear for rotating the said spindle, the gearing allowing sliding movement of the spindle without disengagement of the gearing and spindle, a shifting collar on the spindle, a shifting arm engaging the said shifting collar and provided with a hub, a vertical guideway on the bracket and on which the hub of the shifting arm is mounted to slide, and a treadle device connected with the said slidable shifting arm, as set forth.

2. A boring and tenoning machine comprising a supporting-frame, a bracket secured to said frame, a spindle for carrying the boring or tenoning tool, and extending through bearings on the bracket, a gear for rotating the said spindle, the gearing allowing sliding movement of the spindle without disengagement of the gearing and spindle, a shifting collar on the spindle, a shifting arm engaging the said shifting collar and provided with a hub mounted to slide on a vertical guideway on the bracket, a treadle device connected with the said slidable shifting arm, and an adjustable stop-collar on the upper part of the said spindle and arranged to engage the top of the upper bearing on the bracket, to limit the feeding movement of the spindle, as set forth.

3. A boring and tenoning machine comprising spaced uprights, a bracket secured on said uprights and provided with bearings, a spindle for carrying the boring or tenoning tool, and mounted to turn and to slide in said bearings, a gear for rotating the said spindle, the gearing allowing sliding movement of the spindle without disengagement of the gearing and spindle, a shifting collar on the spindle, a shifting arm mounted to slide and engaging the said shifting collar, a treadle device connected with the said slidable shifting arm, and a spring connected at one end with the said bracket and at the other end with the said slidable arm to return the several parts to an uppermost position on releasing the pressure on the treadle, as set forth.

4. A boring and tenoning machine provided with spaced uprights, a block vertically adjustable on the uprights and provided with a bolt extending between the uprights, a nut screwing on the end of the bolt to hold the block in the adjusted position, a rod pivoted on the block, means for clamping the rod in position on the pivot, a supporting device removably held on the said rod, and means for clamping the supporting device in place on the rod, as set forth.

5. A boring and tenoning machine provided with a work-support comprising a vertically-adjustable block, a rod carried by the block, a table having apertured lugs through which the rod extends, a gage for the said table having a depending apertured lug extending through an opening in the table and engaged by the said rod, and means for clamping the table in position on the rod, as set forth.

6. A boring and tenoning machine provided with a work-support, comprising a block, a rod pivoted on the block, means for locking the rod in place on the block, a table removably held on the said rod, a gage for the said table and adjustably secured to the said rod, and a handled nut screwing on the outer threaded end of the rod against the said table, as set forth.

7. A boring and tenoning machine, comprising spaced uprights, a bracket secured to said uprights and provided with bearings, a spindle for carrying the tool and mounted to turn and to slide in said bearings, gearing for driving the spindle, a shifting collar on said spindle, a shifting arm mounted to slide on a guideway on the bracket and engaging the said shifting collar, a treadle device connected with the said slidable shifting arm, a spring connected at one end with the fixed bracket and at the other end with the said slidable arm, and a work-support adjustably secured to the uprights, as set forth.

In testimony whereof I have signed my name to this specification in the presence of two subscribing witnesses.

ARTHUR A. KOCH.

Witnesses:
O. P. M. BROADSTON,
GEORGE HEBERER.